United States Patent
Horton et al.

[11] Patent Number: 5,159,776
[45] Date of Patent: Nov. 3, 1992

[54] BREECH GUIDE

[76] Inventors: Dwayne Horton, 1922 Houstovia Dr., Knoxville, Tenn. 37918; James C. Welborn, Jr., 707 Parkview Dr., Laurens, S.C. 29360

[21] Appl. No.: 557,553
[22] Filed: Jul. 24, 1990
[51] Int. Cl.⁵ ............................................. A01K 87/04
[52] U.S. Cl. ......................................................... 43/24
[58] Field of Search ............................................. 43/24

[56] References Cited

U.S. PATENT DOCUMENTS

| | | |
|---|---|---|
| 682,730 | 9/1901 | Mitchell . |
| 1,595,275 | 8/1926 | White ........................ 43/24 |
| 1,923,263 | 8/1933 | Heddon . |
| 2,282,618 | 5/1942 | Stewart ..................... 43/24 |
| 2,296,174 | 9/1942 | Meisler . |
| 2,544,238 | 3/1951 | Ritter . |
| 2,776,516 | 1/1957 | Jennette ................... 43/24 |
| 2,777,239 | 1/1957 | Cushman ................. 43/18 |
| 3,099,889 | 8/1963 | Verneuil ................... 43/24 |
| 3,171,228 | 3/1965 | Cwik ......................... 43/24 |
| 3,393,918 | 7/1968 | Styka . |
| 3,862,509 | 1/1975 | Petersen ................... 43/24 |
| 4,174,583 | 11/1979 | Ohmura .................... 43/24 |
| 4,183,163 | 1/1980 | Reimer ..................... 43/24 |
| 4,196,537 | 4/1980 | Ohmura .................... 43/24 |
| 4,212,126 | 7/1980 | Barnett ..................... 43/24 |
| 4,334,379 | 6/1982 | Nelli .......................... 43/24 |
| 4,467,549 | 8/1984 | Dequet ..................... 43/24 |

FOREIGN PATENT DOCUMENTS 197803 3/1978 Fed. Rep. of Germany .
2467546 10/1979 France .

Primary Examiner—Richard K. Seidel
Assistant Examiner—Patty E. Hong
Attorney, Agent, or Firm—Bailey & Hardaway

[57] ABSTRACT

A breech guide is provided for directing fishing line from a reel through the shaft of a fishing rod, exiting the rod tip through a rod tip eyelet. The breech guide is mounted to the rod through a breech guide receptacle incorporated into the rod blank.

4 Claims, 1 Drawing Sheet

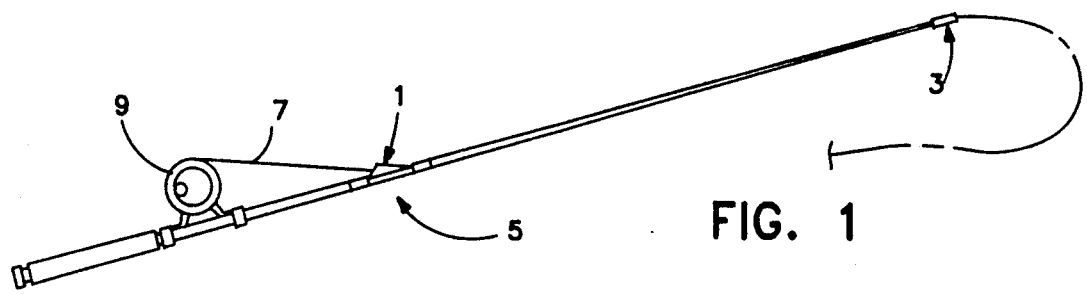
FIG. 1
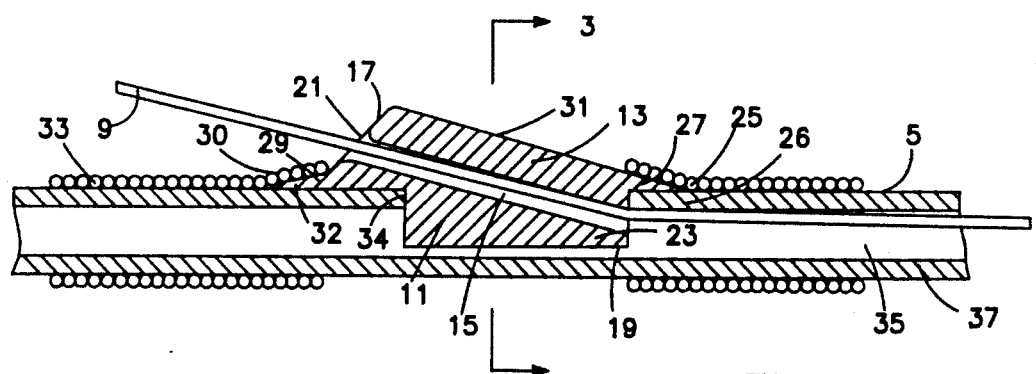
FIG. 2
FIG. 3
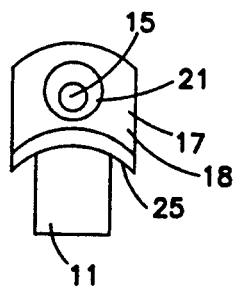
FIG. 4
FIG. 5
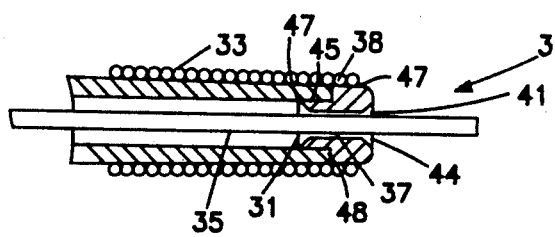

BREECH GUIDE

BACKGROUND OF THE INVENTION

This invention relates to the art of fishing rods and more particularly to the art of a line guide and a rod eyelet which enables the line from a fishing reel to be fed through the hollow core of a fishing rod, exiting at the rod tip through a rod eyelet.

Rod line guides used in the prior art are attached in series to the outer portion of a fishing rod blank to yield a finished product. This arrangement has several disadvantages. One, the attachment of guides to a rod blank is a labor intensive process which adds to the finished rod's cost.

A second disadvantage is the increased handling, transportation, and damage costs which results from the attached rod guides. The relatively fragile rod guides are exposed and prone to damage. Even slight cosmetic flaws created by bent or off-center guides will make a finished rod unmarketable. Similarly, damage to the exposed guides during use or transport by the angler is a common source of rod injury.

Further, rod guides impair the suppleness, flexibility, and vibration sensitivity of a rod. The attachment means of winding or gluing the guides to a rod stiffen the rod and interfere with rod's desired action.

Traditional rod guides also affect the weight and balance of the finished rod. The heavier the rod, the heavier the accompanying reel must be for a balanced combination. Serious sport and professional fishermen desire lightweight equipment to lessen arm fatigue from hours of repetitive casting.

A rod with no external, exposed line is particularly adapted for shore or surface fishing in heavy cover. Exposed branches, limbs, grass, and brush piles are all popular sites for "flipping." Flipping involves numerous short, repetitive casts in tight cover. Obstructions often entangle the exposed line on the rod causing delay, line wear and breakage, and frustration on the part of the angler. By passing the line through the rod, the angler can safely manipulate the rod through obstructions without entangling the line. In addition, the heightened sensitivity of a rod, unimpeded by attached line guides, is a particularly desirable trait for flipping.

While fishing rods with line running through the hollow core are not new, such rods have had inherent drawbacks. A common problem is one of excessive contact and wear between the interior wall(s) of the rod and the line. To compensate, internal guides or lining sleeves are provided as disclosed in U.S. Pat. No. 4,212,126 to Barnett which provides for internal line guides and U.S. Pat. No. 1,595,275 to White which discloses a tube lining the rod shaft. However, these features interfere with a rod's sensitivity and prove difficult to repair when a guide does break or become loose. In addition, they provide no protection to the line from excess abrasion.

Other existing breech guides contribute to excessive line wear by imparting too great an entry angle to the line and/or by not providing an optimal smooth surface where the line contacts the breech guide. Further, many breech guides require internal or external sleeves or reinforcement material to be added to the attachment site. One such device is provided by U.S. Pat. 2,776,516 to Jennette which discloses an adapter sleeve. Such designs may structurally strengthen a rod weakened by the insertion of a large breech guide, but their subsequent reinforcement means dampens the desired sensitivity of the rod.

To date, there has been no effective way to provide a quality, long-lasting rod which dispenses with external line guides. Therefore, much room for improvement in the art exists.

SUMMARY OF THE INVENTION

It is an object of this invention to provide a breech guide for fishing rods to direct the fishing line from a reel into the hollow interior of a rod.

It is a further object of this invention to provide a rod tip eyelet guide for the line as it emerges from the rod tip.

It is a still further object of this invention to provide a receptacle for a rod which is designed to accept a breech guide.

BRIEF DESCRIPTION OF THE DRAWINGS

FIG. 1 illustrates the breech guide and tip eyelet attached to a fishing rod.

FIG. 2 is a sectional view of the breech guide attached to a rod.

FIG. 3 is a transverse section of the breech guide and rod taken along line 3—3 of FIG. 2.

FIG. 4 is an elevation view of the entrance face of the breech guide.

FIG. 5 is a sectional view of the rod tip eyelet attached to a fishing rod.

DETAILED DESCRIPTION

In accordance with this invention, it has been found that a breech guide can be secured to a traditional fishing rod blank which allows the fishing line to be threaded into the interior rod shaft or core, exiting through an eyelet at the rod tip. Furthermore, the invention provides for rod blanks with a mated receptacle designed to house a breech guide.

FIG. 1 of the drawings show the breech guide and tip eyelet 3 attached to a representative fishing rod 5. Line 7 is threaded from the reel 9 into breech guide 1, traversing the rod shaft before exiting the rod at eyelet 3.

As seen in FIG. 2 the breech guide consists of a rectangular platform carrying a wedge-shaped shoe 13. A polished, cylindrical bore 15 obliquely traverses the breech guide 1. The bore 15 is in communication with the heel 17, a short upper surface of the shoe 13, at one terminus and with the forward face 19 of the rectangular platform 11 at the other terminus. In the preferred embodiment, the heel 17 has an upper heel surface 18 surrounding the cylindrical bore 15. The upper heel surface 18 tapers into a funnel-shaped line feed aperture 21 in communication with the cylindrical bore 15. A similar funnel-shaped rod feed aperture 23 is provided on the forward face 19 of the platform 11, also in communication with the bore 15. The tapered line feed 21 and rod feed 23 apertures allow the line 7 to pass through the polished breech guide 1 with a minimum of friction and abrasion.

In the preferred embodiment shown in FIG. 4, an arcuate undersurface 25 of the shoe 13 overlaps the rectangular platform 11. The arcuate undersurface 25 is designed to engage the curved surface 26 of the rod, stabilizing the attached configuration shown in FIG. 2. A first mounting sleeve 27 and a second mounting sleeve 29 is provided by an extension of the arcuate shoe undersurface 25. A first arcuate upper surface 28 of the first mounting sleeve 27 is contiguous with the inclined ridge 31 of the shoe 13. A second arcuate upper surface 30 of the second mounting sleeve 29 is contiguous with an angled heel base 32 extending from heel 17. The arcuate upper surfaces 28 and 30 of the mounting sleeves 27 and 29 facilitate the use of thread windings 33 to attach the breech guide in a fashion similar to line guide attachment means in the established art. However, adhesives may also be used to secure the breech guide to the rod.

The breech guide is inserted lengthwise into an axial receptacle 34 of the rod, the forward face 19 of platform directed towards the rod tip. The receptacle 34 conforms to the dimensions of the rectangular platform 11 of the breech guide 1. Best results are obtained with the rod receptacle 34 positioned 10 to 16 inches from the reel. However, the optimal distance may vary depending upon the length, diameter, and type of rod as well as the type rod handle provided. On a bait casting rod the receptacle should be on the upper surface of the rod. For a spinning rod, the receptacle should be located on the rod's undersurface. Various sized breech guides can also be provided to accommodate different rod lengths and diameters.

It has been found that for efficient casting, the breech guide 1 must impart a sufficient angle to the line 7 as the line enters the shaft 35 of the rod. If, in reference to a rod, the line enters the rod via the breech guide 1 at an angle close to zero, the line has too much contact with the interior wall(s) 37 of the rod. The result is excessive friction, decreased casting accuracy, shorter casting distances and increased line and rod wear. Similarly, if the line enters the rod at too great an angle, excessive friction occurs between the breech guide 1 and the line 7. An angle of entry of 15 degrees between the bore 15 of the breech guide 1 and the rod 5, has been found to minimize the line contact with the interior wall 37 of the rod while permitting easy passage of the line 7 into the breech guide 1.

In operation, line 7 from a reel 9 is manually inserted into the line feed aperture 21, passing through the bore 15 and exiting the rod aperture 23 into the rod shaft 35. A gentle casting or whipping action of the rod 5 passes the line 7 through the rod shaft 35, exiting the rod through the rod tip eyelet 3 as seen in FIGS. 1 and 5.

In the preferred embodiment, the breech guide is constructed of a hard, long-wearing material such as polished ceramic. Other materials will suffice but do not wear as well as ceramic.

In a different embodiment, the breech guide is an externally threaded housing attached to a ceramic sleeve through which a polished line bore traverses. The bore is in communication with an upper external first end and a lower internal second end of the breech guide. The exterior of the breech guide housing is intimately attached to the outer surface of the sleeve.

A lower threaded surface region of the housing is associated with the internal second end of the sleeve. An upper surface region of the housing is associated with the external first end of the sleeve and defines a terminal engaging head. The lower threaded region is designed to engage a threaded rod receptacle. The threaded receptacle is in communication with the interior of the rod shaft and the outer rod surface. When the rod breech guide is inserted and secured by the threaded means, the breech guide enables line to be fed through the polished bore via an funnel-shaped entrance, exiting the breech guide through a funnel shaped exit. An adapter can be provided to secure the engaging head to the angled surface of the curved rod. In addition, the threaded rod receptacle can be of an inserted material better suited for engaging a threaded surface than that of the rod itself.

Threaded breech guides facilitate the manufacturing of the rods. The small threaded receptacle preserves the rod's structural and physical integrity and does not require threaded windings to secure. Further, the threaded breech guides are easily replaced by the user. Finally, the cylindrical design allows the exit bore of the breech guide to be positioned in the very center of the rod shaft. This preferred arrangement minimizes line contact with the rod shaft.

Rods can be manufactured with a built-in or a molded breech guide. However, best results are obtained when existing rod blanks are provided with a receptacle for mounting an appropriate sized breech guide. This arrangement allow the maximum rod suppleness and vibration conductance to be maintained.

FIG. 5 shows a rod tip eyelet 3 for use in rods with an internal line feed mechanism. The eyelet 3 consists of a T-shaped cylindrical housing (38) which defines a vertical polished bore 37. The bore is in communication with a lower entrance port 39, defined by a lower port groove 43 on the face of the housing 38 and an upper exit port 41 defined by a upper port groove 44 on a rim 47 of the tip eyelet 3. The upper port 41 and lower port 39, having no abrupt lines or edges, minimize friction and line wear.

A narrow neck 45 of the eyelet 3 fits tightly within the rod shaft 35, secured by typical attachment means within the art such as adhesives and/or threaded windings 33. A larger diameter rim 47 is seated against the rod tip 48, protecting the rod tip. However, if desired, the rim 47 could be of the same diameter as the neck 45 either terminating flush with the rod tip or extending outwardly from the rod tip. In the preferred embodiment, the eyelet 3 is constructed of polished ceramic. While other materials will suffice, ceramic eyelets have proven to be long wearing and impart the least line wear.

The ceramic breech guides and eyelets can be constructed in a variety of colors to compliment the aesthetic appeal of the rods. In addition, the ceramic breech guides and eyelets can be utilized in a variety of rod and reel combinations. Spinning, bait-casting, and spin-cast rod and reel combinations are all suitable for operation with the claimed breech guide and eyelet. Two-piece rods and telescopic rods are equally capable of being used as described above.

Also, a rod can incorporate a breech guide and tip eyelet and also carry traditional external line guides. In this manner, one may use a single rod for different fishing techniques. Existing art in the field could construct a combination eyelet having both an internal and an external rod tip guide to allow a dual purpose rod.

While existing rod blanks perform well when fitted with a breech guide and eyelet, water picked up from the line does accumulate in the rod shaft during use. The interior of a rod may be coated with teflon or a hydrophobic substance to help dispel the water. However, accumulated water does not impair the rod's use for short, accurate, casts used in "flipping."

It is thus seen that the instant invention provides a simple, improved breech guide for directing fishing line from a reel through the hollow shaft of a rod. It is further seen that this invention provides a rod tip eyelet guide for use with rods having the line running through the rod shaft. Finally, the invention provides a receptacle for fishing rods which will accept a breech guide. As many variations are apparent to one skilled in the art from reading the above specifications, such variations are within the spirit and the scope of the instant invention as defined by the following appended claims.

That which is claimed is:

1. An eyelet, by means attached to a fishing rod tip where a fishing line passes through a rod shaft and exits through eyelet comprising:

a cylindrical, T-shaped housing with a smaller diameter neck and a larger diameter rim, said housing defining a cylindrical bore, an entrance port and an exit port, and said bore traversing said T-shaped housing in a vertical fashion and in communication with said entrance port and said exit port;

said neck being of a diameter smaller than that of said shaft so that said neck fits into said shaft thereby decreasing the diameter of said shaft.

2. The apparatus as recited in claim 1 wherein said eyelet is constructed of ceramic.

3. The apparatus as recited in claim 2 wherein said entrance port is a tapered diameter groove of said housing, said bore being in communication with said tapered groove.

4. The apparatus as recited in claim 2 wherein said exit port is a tapered diameter groove of said housing, said bore being in communication with said tapered end.

* * * * *